Jan. 19, 1937.  R. G. QUEHL  2,068,072
FEED REGULATOR FOR DRY MATERIALS
Filed Sept. 9, 1932  4 Sheets-Sheet 1

Inventor
RICHARD G. QUEHL
By Paul, Paul & Moore
ATTORNEYS

Jan. 19, 1937.　　　　R. G. QUEHL　　　　2,068,072

FEED REGULATOR FOR DRY MATERIALS

Filed Sept. 9, 1932　　　　4 Sheets-Sheet 3

INVENTOR
RICHARD G. QUEHL

By Paul, Paul & Moore
ATTORNEYS

Jan. 19, 1937.  R. G. QUEHL  2,068,072
FEED REGULATOR FOR DRY MATERIALS
Filed Sept. 9, 1932  4 Sheets-Sheet 4

INVENTOR
RICHARD G. QUEHL
By Paul, Paul Moore
ATTORNEYS

Patented Jan. 19, 1937

2,068,072

UNITED STATES PATENT OFFICE 2,068,072

FEED REGULATOR FOR DRY MATERIALS

Richard G. Quehl, Minneapolis, Minn., assignor to The Strong-Scott Mfg., Co., Minneapolis, Minn., a corporation of Minnesota Application September 9, 1932, Serial No. 632,366

10 Claims. (Cl. 83—44)

This invention relates to new and useful improvements in feed regulators and more particularly to such an apparatus adapted for use to feed dry, granular, and pulverulent materials from a source of supply to a suitable receiving means.

An object of the invention is to provide an improved method of feeding dry, granular material into a suitable receiving means such, for example, as an attrition mill, which consists in shaping the material into a column and successively feeding measured quantities of the material from the bottom of said column into the mill.

A further object is to provide a feed regulator adapted for use in connection with an attrition mill, or other apparatus, for feeding dry, granular, and pulverulent material thereto in a constant, uniform flow, and having means whereby the feeding of the material therefrom may be quickly and conveniently varied to any desired degree between minimum and maximum, and the apparatus being so constructed that it may be operated in either direction of rotation without in any way affecting the feeding of the dry material therefrom.

A further object is to provide a feed regulator for an attrition mill, comprising a casing provided at its upper portion with a hopper and having a discharge opening at its lower portion communicating with the intake of the mill, and a rotor being mounted within said casing between the hopper and said discharge opening having a plurality of pockets in its periphery adapted to receive material from the hopper and convey it to said discharge opening, and walls of the hopper being formed of yieldable elements such, for example, as stiff bristles, the ends of which are positioned to wipingly engage the partitions between said pockets to thereby prevent the pockets from over-filling so that each pocket will deliver a measured quantity of material to the discharge opening. Said bristles also allow sticks and other foreign matter, which may be associated with the material to be ground, to pass through without choking the regulator.

A further object is to provide a feed regulator comprising a casing provided at its upper portion with a hopper and having a discharge opening at its lower portion, and a rotor being mounted between the hopper and said discharge opening and having a portion thereof forming the bottom of the hopper, and said rotor comprising a plurality of radially disposed blades mounted for relative movement in suitable slots provided in the periphery of the rotor, whereby said blades will be driven by the rotor, when the latter is operating, and the opposite ends of said blades being supported in annular members rotatably mounted in suitable bearings provided in the end walls of the casing, and the body of said rotor being mounted for vertical adjustment with respect to the said blade supporting members, whereby the depth of the pockets in the upper portion of the periphery of the rotor may be varied to regulate the quantity of material conveyed by said pockets.

A further object is to provide a feed regulator for feeding dry material, comprising a casing provided at its upper portion with a hopper and at its lower portion with a suitable discharge opening, and a rotor being mounted between the hopper and said discharge opening having pockets in its periphery adapted to feed the material from said hopper to the discharge opening in measured quantities, and means being provided for varying the capacity of said pockets to regulate the feeding of the material from the hopper to said discharge opening.

Other objects of the invention reside in the provision of the brushes forming the side walls at the bottom of the hopper, which are composed of relatively stiff bristles arranged to wipingly engage the outer edges of the blades of the rotor; in the novel means for supporting the rotor, whereby it may be readily adjusted to vary the capacity of the pockets in the periphery thereof without interrupting the operation of the regulator; in the means provided for supporting the rotor blades in the end walls of the casing whereby said blades are retained in concentric relation to the axis of the casing, regardless of the vertical adjustment of the rotor; in the general construction and organization of the parts of the regulator, which is such that the rotor thereof may be rotated in either direction with results; and, in the simple and inexpensive construction of the apparatus as a whole, which comprises few parts, all of which are readily interchangeable.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow, In the drawings:

Figure 1:
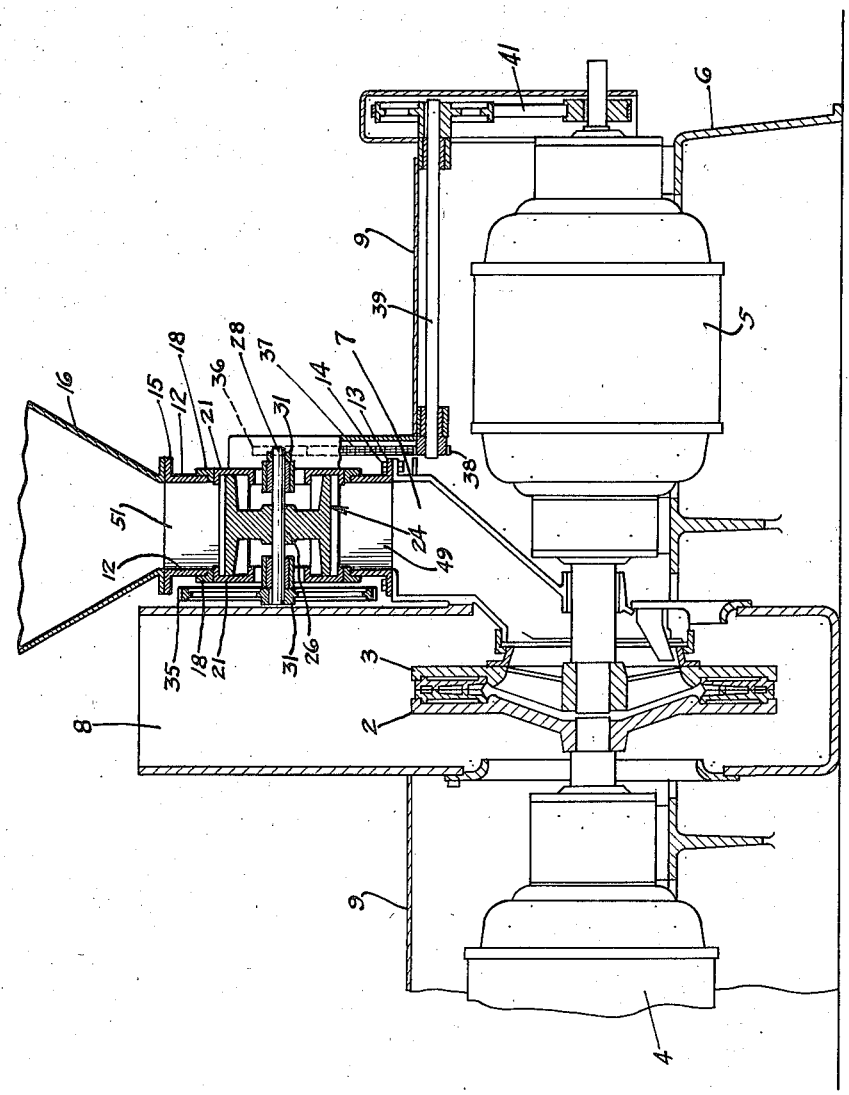
Figure 1 is a view showing my improved feed regulator used in connection with an attrition mill of ordinary construction.

In the selected embodiment of the invention here shown, there is illustrated in Figure 1, for purposes of disclosure, a portion of an attrition mill similar to the one shown in my copending application, Serial No. 616,484, filed June 10, 1932, which comprises a pair of grinding disks or elements 2 and 3, shown driven by motors 4 and 5, respectively, suitably supported upon the base 6 of the mill. The mill is shown provided with the usual intake 7 and discharge opening 8, and suitable housings 9 provide enclosures for the motors 4 and 5.

Figure 2:
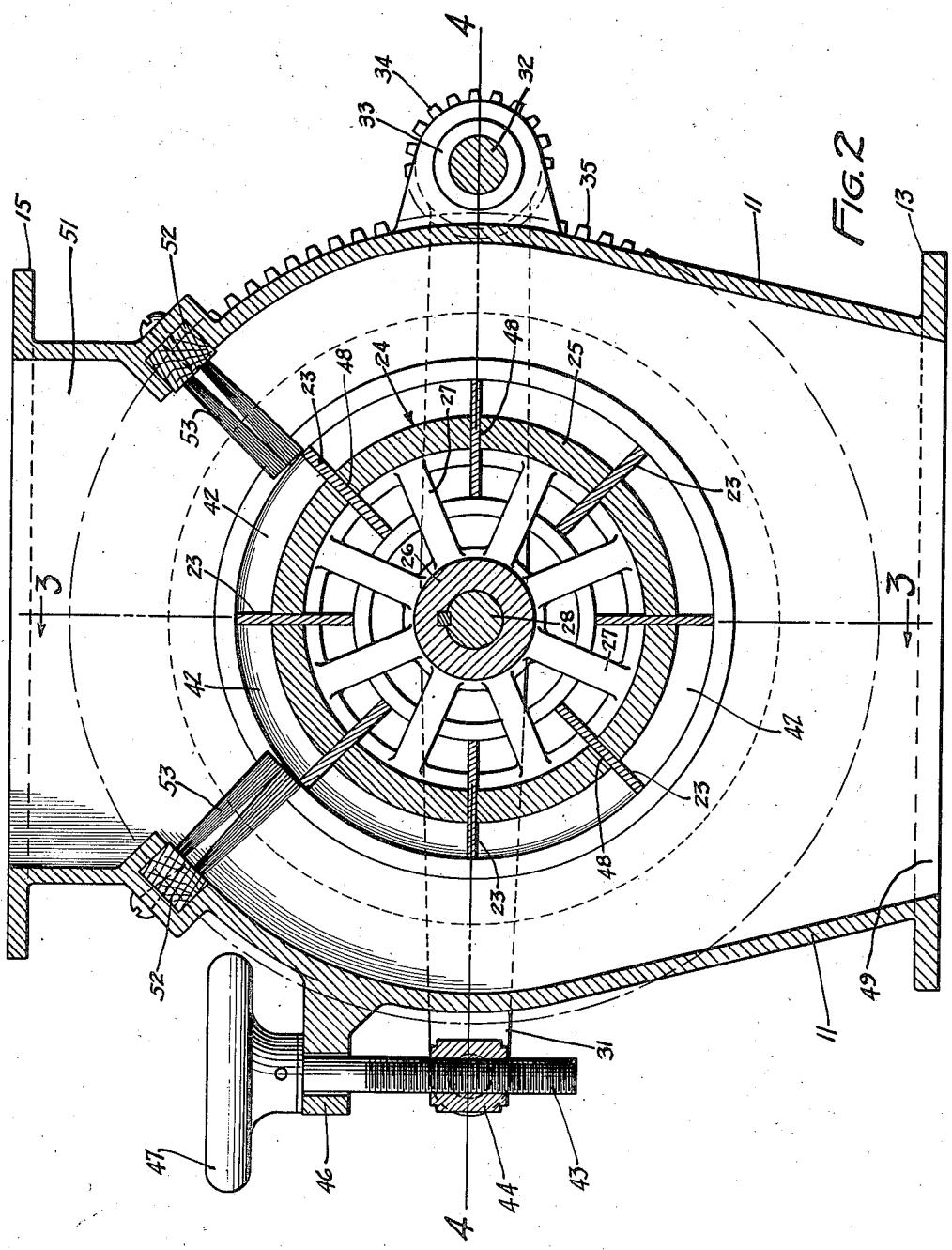
Figure 2 is an enlarged cross-sectional view on the line 2—2 of Figure 3, showing the interior construction of the regulator.
Figure 3:
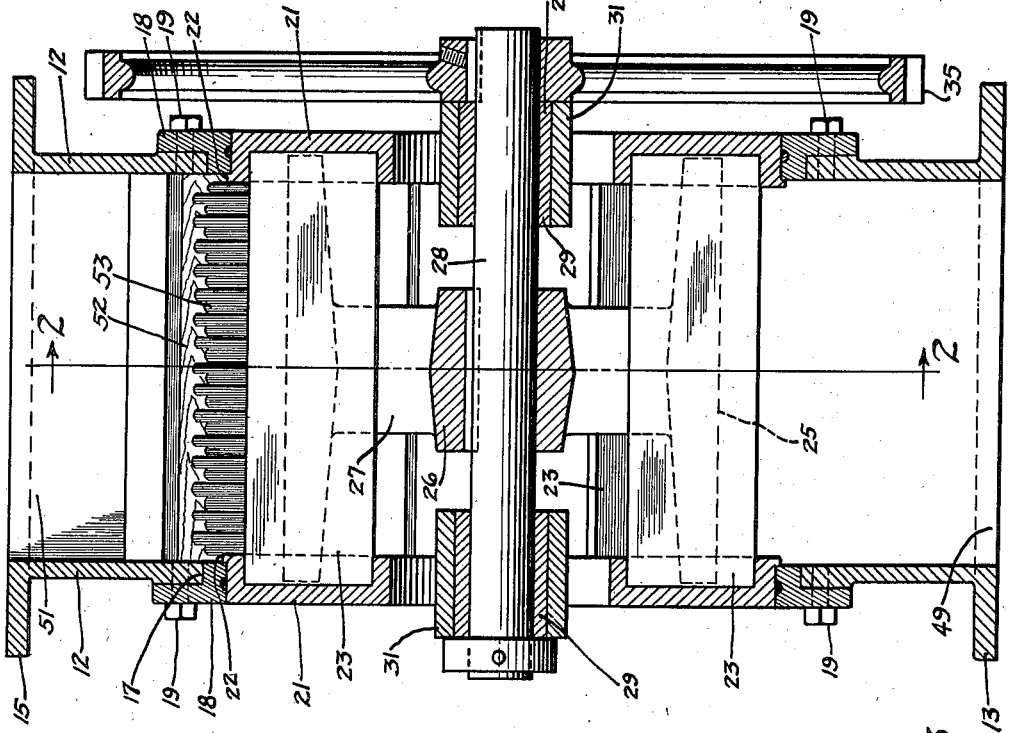
Figure 3 is a vertical sectional view on the line 3—3 of Figure 2, showing the means for supporting the blades in the end walls of the casing.
Figure 4:
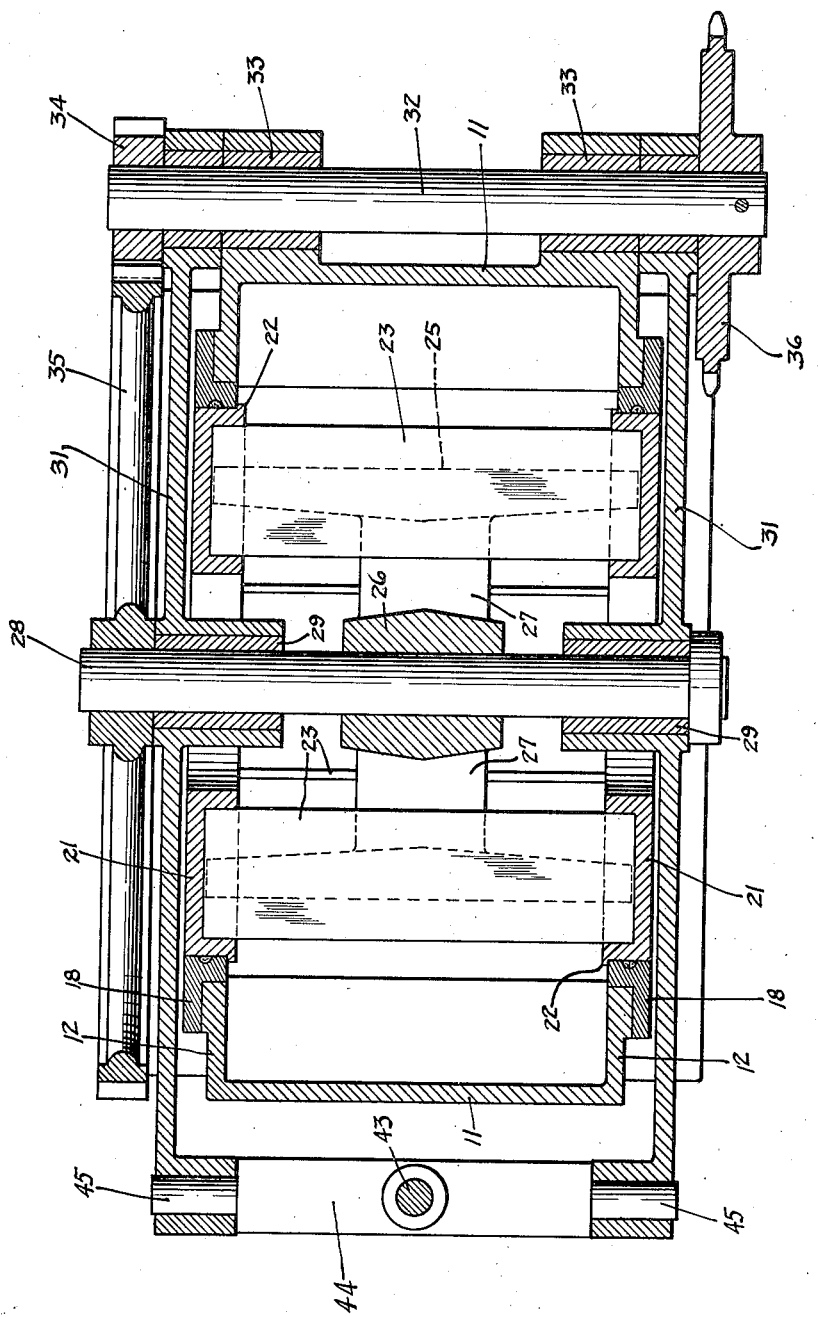
Figure 4 is a sectional plan view on the line 4—4 of Figure 2, showing the means for adjustably supporting the rotor.

The novel feed regulator herein disclosed is best shown in Figures 2, 3, and 4, and comprises a suitable casing having side walls 11 and end walls 12. The side walls are preferably shaped as shown in Figure 2, and a suitable flange 13 is provided at the lower portion of the casing whereby it may be secured by bolts 14, to a suitable support such as the intake 7 of the mill. The upper portion of the casing is shown provided with a similar flange 15 to which a suitable hopper or feed spout 16 may be secured.

The end walls 12 of the casing are shown provided with enlarged circular openings 17 in each of which a bearing ring 18 is mounted. These rings are secured to the casing walls 12 by suitable bolts 19. Members 21 are rotatably mounted in the bearing rings 18, as shown in Figure 3, and are provided at their inner ends of their peripheries with small radially disposed heads or flanges 22 adapted to engage the inner ends of the bearing rings 18, to thereby prevent relative outward movement of the members 21 in said bearings. A plurality of blades 23 are interposed between the members 21, and have their ends suitably supported therein. These blades are spaced equi-distant apart, circumferentially, as shown in Figure 2, and are mounted for rotation with the members 21. It will be noted, by reference to Figure 2, that the members 21 and blades 23 are concentrically disposed with respect to the axis of the casing.

The blades 23, in reality, constitute a part of a rotor 24, comprising a rim 25 supported on a suitable hub 26 by radial arms 27. The rotor hub 26 is secured to a shaft 28 mounted in suitable bearings 29 provided in a pair of arms 31 pivotally supported upon a cross shaft 32, as best shown in Figure 4. The cross shaft 32 is rotatably mounted in bearings 33 provided upon one of the end walls 11 of the casing, and has a pinion 34 secured to one end thereof, which meshes with a gear 35 secured to one end of the rotor shaft 28. A suitable sprocket 36 is shown secured to the opposite end of the cross shaft 32, which may be connected by a chain 37 to a drive pinion 38 secured to one end of a shaft 39, the opposite end of which may be driven from the motor 5 by a suitable belt drive 41, as shown in Figure 1. By thus connecting the rotor 24 with the motor 5, the rotor will rotate continuously when the motor 5 is operating. The rim 25 of the rotor has a plurality of transverse slots 48 therein adapted to receive the blades 23. These blades cooperate to provide a series of spaced pockets 42 in the periphery of the rotor as will readily be understood by reference to Figure 2.

Figure 5:
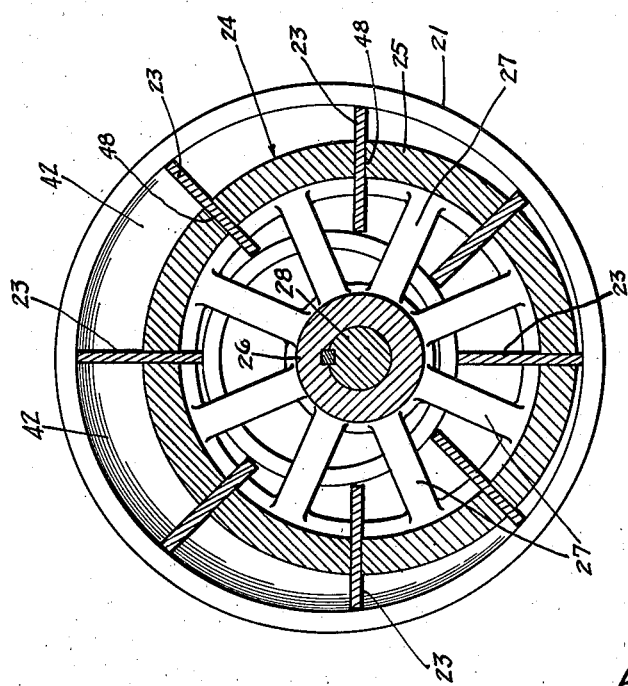
Figure 5 is an enlarged detail sectional view showing one end of the rotor and the means for supporting the blades independently thereof, and also showing the rotor adjusted to increase the depth of the pockets at the upper portion of the rotor.

In order to vary the feeding of the material from the regulator without increasing or decreasing the speed of the rotor, means is provided for varying the depth of the rotor pockets 42. Such means is best shown in Figures 2 and 4 and comprises an adjusting screw 43 received in threaded engagement with a cross bar 44 having its terminals 45 pivotally connected with the ends of the arms 31 which support the rotor. The upper portion of the screw 43 may be rotatably supported in a lug 46, shown integrally formed with one of the side walls 11 of the casing, and has a hand wheel 47 secured thereto whereby the screw may conveniently be rotated. Rotation of the screw 43 in one direction will lower the rotor 24 from the position shown in Figure 2 to that shown in Figure 5, wherein it will be noted that the pockets 42 at the upper portion of the rotor will be increased in depth so that the capacity thereof will be increased. Conversely, when the screw is rotated in the opposite direction, the depth of the pockets will be correspondingly decreased. When the rotor 24 is positioned as shown in Figure 5, the blades 23 will continuously move in the slots 48 because of the eccentricity of the rotor with respect thereto. When the rotor body is positioned as shown in Figure 2, there will be no relative movement between the blades and the rim of the rotor.

A discharge opening 49 is provided at the lower portion of the casing, and the walls at the upper portion of the casing cooperate to provide an intake hopper 51, into which the material to be ground may be delivered from the spout 16.

A feature of the invention resides in the construction of the lower walls of the hopper 51 of the regulator casing which, as shown in Figure 2, comprises a pair of brushes 52 composed of relatively stiff bristles 53. The free ends of these bristles are adapted to wipingly engage the peripheral edges of the blades 23, as shown in Figure 2, so that when the rotor is operating, one of said brushes will prevent the rotor pockets from over-filling. Because of the yieldability of the bristles, should a stick or some other relatively large object which may be entrained with the material to be ground, become lodged in one of the pockets of the rotor with a portion thereof projecting therefrom, the bristles engaged directly thereby will yield and permit said object to pass without danger of damaging the regulator, and without a deflection of the wall formed thereby. Sticks and other foreign matter which may be mixed with the material delivered to the regulator may thus pass therethrough without affecting the operation of the regulator. It is to be understood that material containing sticks and other foreign matter is usually passed through a device for separating out such foreign matter before the material is delivered into the regulator.

In the drawings, I have shown the improved feed regulator as used in connection with an attrition mill, but it is to be understood that it may be used in connection with various types of apparatus requiring means for regulating the feed of a dry pulverulent material thereto. Because of the symmetric construction of the regulator, the rotor may be rotated in either direction of rotation without affecting the accuracy and efficiency of the regulator. This is an important feature in that it often simplifies the driving connection between the regulator and its driving means. The simple means provided for vertically adjusting the rotor 24 is also essential in that the feed of the material from the hopper 51 may be accurately controlled at all times, and to any desired degree from minimum to maximum. The feed hopper 51 and discharge opening 49 of the regulator are disposed at opposite sides of the rotor, the hopper 51 preferably being directly over the rotor and the discharge opening 49 below it, so that the material may feed by gravity through the regulator when the rotor is operated.

While I have shown the regulator as used in connection with an attrition mill, it is to be understood that it may be used in connection with various other types of apparatus where applicable, without departing from the scope of the invention.

I claim as my invention:

1. In a regulator for feeding dry, granular, and pulverulent material, a casing having a hopper in its upper portion into which the material to be ground is delivered, said casing having a discharge opening at its lower portion communicating with the mill, a rotor mounted between the hopper and said discharge opening, said rotor comprising a body portion having a plurality of spaced apart slots in its periphery, a plurality of blades mounted in said slots and adapted to be rotated by movement of said rotor, means in opposite walls of said casing for supporting said blades independently of the rotor, and means for vertically adjusting the rotor independently of said blades, whereby the depth of the rotor pockets may be varied to thereby control the feeding of the material from the hopper to the mill.

2. In a regulator for feeding dry, granular, and pulverulent material, a casing provided at its upper portion with a hopper and at its lower portion with a discharge opening, a rotor in said casing between said hopper and said discharge opening, said rotor having a plurality of pockets formed in the periphery thereof, opposite walls of the hopper being symmetrical and formed of a plurality of yieldable elements, the free ends of which are positioned to wipingly engage the periphery of said rotor, means for varying the capacity of the pockets in said rotor to control the feeding of the material from the hopper to the discharge opening, and each of said pockets being symmetrical about its radial centerline, whereby the rotor may be operated either clockwise or counter-clockwise to feed the material.

3. In a regulator for feeding dry, granular, and pulverulent material, a casing provided at its upper portion with a hopper and at its lower portion with a discharge opening, a rotor in said casing between said hopper and said discharge opening, a plurality of axially disposed radial blades operatively connected with the periphery of the rotor and cooperating therewith to provide a series of peripheral pockets in said rotor, means for supporting said blades independently of the rotor but permitting the blades to be driven by said rotor, a wall of the hopper being formed of a plurality of relatively stiff bristles, the free ends of which are positioned to wipingly engage the periphery of said rotor, and a yoke for supporting said rotor and by which the rotor may be vertically adjusted with respect to said blades to vary the depth of the pockets in the upper portion of its periphery, to thereby control the feeding of the material from the hopper to the discharge opening.

4. In a regulator for feeding dry, granular, and pulverulent material, a casing provided at its upper portion with a hopper and at its lower portion with a discharge opening, a rotor in said casing between said hopper and said discharge opening, a plurality of radially disposed blades operatively connected with the periphery of the rotor and cooperating therewith to provide a series of peripheral pockets in said rotor, means for supporting said blades independently of the rotor, a yoke for supporting said rotor, and means for actuating said yoke to vertically adjust the rotor with respect to said blades to thereby vary the depth of the pockets in the upper portion of its periphery, whereby the feeding of the material from the hopper to the discharge opening may be controlled.

5. In a regulator for feeding dry, granular, and pulverulent material, a casing provided at its upper portion with a hopper and at its lower portion with a discharge opening, a rotor mounted within the casing between said hopper and said discharge opening and having a plurality of radial slots in its periphery, blades mounted in said slots and cooperating to provide a plurality of pockets, members movably mounted in the end walls of the casing for supporting said blades, means for supporting the rotor independently of said blades, and means for adjusting the rotor vertically with respect to said blades to thereby vary the depth of the pockets at the upper portion of the rotor, whereby each pocket will convey a predetermined quantity of material from the hopper to the discharge opening.

6. In a regulator for feeding dry, pulverulent material, a casing having an intake at its upper portion and a discharge opening at its lower portion, a rotor mounted within the casing between the intake and said discharge opening and having a plurality of transverse slots in its periphery, blades mounted in said slots and cooperating to provide a plurality of pockets in the periphery of the rotor, bearing members rotatably mounted in the end walls of the casing and supporting said blades, a pivoted yoke supporting the rotor, and means connected with said yoke by which the rotor may be vertically adjusted independently of said blades to thereby vary the depth of the pockets in the upper portion of the rotor to control the feeding of the material from the intake to the discharge opening.

7. In a regulator for feeding dry, pulverulent material, a casing having an intake and a discharge opening, a rotor mounted within the casing between the intake and said discharge opening and having a plurality of transverse slots in its periphery, blades mounted in said slots and cooperating to provide a plurality of pockets in the periphery of the rotor, bearing members rotatably mounted in the end walls of the casing and supporting said blades independently of the rotor, a pivoted yoke supporting the rotor, and threaded means for actuating said yoke to vertically adjust the rotor independently of said blades to thereby vary the capacity of the pockets in the upper portion of the rotor to control the feeding of the material from the intake to the discharge opening.

8. In a regulator for feeding dry, granular, and pulverulent material, a casing provided at its upper portion with a hopper and at its lower portion with a discharge opening, a rotor mounted within the casing between the hopper and said discharge opening and having a plurality of transverse slots in its periphery, blades mounted in said slots and cooperating to provide a plurality of pockets, bearing members rotatably mounted in the end walls of said casing and concentric therewith, said blades having their ends supported in said bearing members whereby said blades and bearing members may rotate with the rotor as a unit, a yoke pivoted to one side of the casing and supporting said rotor, means at the opposite end of the yoke for vertically moving the yoke to thereby vertically adjust the rotor with respect to said bearing members and blades to thereby vary the depth of the pockets at the upper portion of the rotor beneath said hopper, and a wall of the hopper being composed of yieldable elements, the free ends of which are adapted to wipingly engage the edges of said blades whereby each pocket will convey a predetermined quantity of material from the hopper to the discharge opening.

9. In a regulator for feeding dry, granular material, a casing having a suitable discharge opening at its lower portion, a hopper in the upper portion of the casing, a rotor mounted for reversible rotation between the hopper and said discharge opening and having a plurality of pockets in its periphery for conveying material from the hopper to said discharge opening, and opposed walls of the hopper being composed of relatively long bristles supported at one end only and having their free ends substantially engaging the periphery of the rotor, said bristles being free to flex when engaged by foreign objects which may be entrained with the material whereby such objects may pass through the regulator without damaging it.

10. In a regulator for feeding dry, granular material, a casing having a discharge opening at its bottom and a hopper at its upper portion, a rotor in the casing whose diameter is relatively smaller than the horizontal width of the casing to thereby provide comparatively large spaces or chambers between the periphery of the rotor and the opposite walls of the casing, and bristles secured to the wall of the casing and extending inwardly with their free ends substantially engaging the periphery of the rotor, whereby they form opposed bottom walls of the hopper, said bristles being unsupported laterally whereby the free ends thereof may flex when engaged by a relatively large foreign object delivered into the regulator with the material, to thereby permit such objects to pass through the regulator without damaging the same.

RICHARD G. QUEHL.